United States Patent [19]

Rubin et al.

[11] 3,880,717

[45] Apr. 29, 1975

[54] METHOD OF CULTIVATING MICROORGANISMS

[76] Inventors: Leonid Borisovich Rubin, Leninsky prospekt, 6I/I, kv. 21, Moscow; Olga Vladimirovna Eremeeva, 3 pochtovoe Otdelenie, 15, kv. 28, Ljubertsy, Moskovskoi oblasti; Andrei Borisovich Rubin, Moscow; Natalya Mikhailovna Gorjukhova, ultisa Chkalova, 14/16, kv. 36, Moscow; Andrei Valentinovich Ivanov, Mikrorian "V", 28, kv. 31, Puschino Moskovskoi oblasti; Grigory Yakovlevich Fraikin, Leninsky prospekt, 81, kv. 146, Moscow, U.S.S.R.; Nina Borisovna Gradova, ulitsa Planernaya, 16, korpus 1, kv. 20, Moscow, all of U.S.S.R.

[22] Filed: Oct. 9, 1973

[21] Appl. No.: 404,735

Related U.S. Application Data

[63] Continuation of Ser. No. 239,805, March 30, 1972, abandoned.

[30] Foreign Application Priority Data

Mar. 30, 1971  U.S.S.R............................ 1634070
Nov. 1, 1971   U.S.S.R............................ 1708930

[52] U.S. Cl. .................... 195/112; 195/76; 195/46; 195/79; 195/8 D; 195/120
[51] Int. Cl. ......................... C12b 1/00; C12b 1/20
[58] Field of Search ............. 195/112, 46, 113, 120, 195/76, 79

[56] References Cited

UNITED STATES PATENTS 1,140,882  5/1915  Fazi ................................... 195/112

OTHER PUBLICATIONS

Burchard et al., J. of Bacteriology, Feb. (1966), Vol. 91, No. 2 pp. 535–545.
Rubin et al., Successes of Contemporary Biology, Vol. 71, No. 2 (1971) pp. 220–234.
Chem. Abstracts, Vol. 71:120619w.
Chem Abstracts, 68:112455n.

*Primary Examiner*—A. Louis Monacell
*Assistant Examiner*—Thomas D. Wisemam
*Attorney, Agent, or Firm*—Holman & Stern

[57] ABSTRACT

A method of cultivating microorganisms wherein the seeding culture of a microorganism is exposed to light within a spectral range of 300–750 nm and then seeded in the culture medium to be cultivated therein.

The proposed invention finds application in the medical, the microbiological and food industries, as well as in farming practice and other spheres.

5 Claims, No Drawings

METHOD OF CULTIVATING MICROORGANISMS

This is a continuation, of application Ser. No. 239,805, filed Mar. 30, 1972, now abandoned.

The present invention is concerned with a method of cultivating microorganisms and finds application in the medical, microbiological and food industries, as well as in farming practices and other spheres.

The proposed invention relates to physical methods of intensifying the processes of vital activity and biosynthesis of microorganisms such as those belonging to the genera Candida, Saccharomyces, Schizosaccharomyces, Bacillus, Bacterium, Pseudomonas, Clostridium, Lactobacterium, Propionibacterium, Aspergillus, Penicillium, Mucor, Rhizopus, Streptococcus, Aerobacter, Micrococcus, Mycobacterium, Currulia, Digimella, Acetobacter, Cremothecium, Actinomyces, Alternaria, Arthorabacter, Azotobacter, Csehirichia, Fusarium, Methanobacterium, Neurospore, Nitrobacter, Nocarida, Ruminococcus, Serratia, Streptomyces.

A method of cultivating microorganisms, is known in the prior art said method comprising the following flasks containing the culture medium are inoculated with dry conidia of the fungus *Aspergillus niger* in order to cultivate them within a 48–50 hour period under the effect of a unilateral illumination with luminescent lamps having an intensity of 60 W/m$^2$ (6.10$^4$ erg/cm$^2$.sec) without stirring while being maintained at 30–32°C.

Once the growth process has been terminated the culture medium is eliminated and 30 ml of a 20-percent solution of sugar and a 0.19-percent ammonium chloride are poured under the fungal film. The fungi are then kept in the fermentation broth for 96–120 hours, with the acidity thereof being determined by titrating some with a 0.1 N solution of NaOH. According to the data of the above method, exposure of the fungus culture to light for the entire growth period (i.e. 48–60 hours) increases the acid formation in the culture by 30–70 percent, provide that the terminal stage of the fermentation process occurs in darkness. Exposure of the culture to light at this stage of fermentation reduces the acid formation by 30 percent.

A disadvantage inherent in said method is the fact that it involves a prolonged (48–60 hours) exposure of the microorganism culture to light. Besides, the necessity of illuminating the culture at that stage of fermentation presents considerable difficulties as to the apparatus and equipment involved.

It is an essential object of the present invention to simplify the technique and equipment involved in the realization of the method thereof.

Said object is attained due to the fact that in a method for cultivating microorganisms, incorporating the preparation incorporates the use of an inoculation culture, a seeding the latter in the culture medium, cultivating said culture with the use of light exposure of the latter, and according to the invention the inoculation culture of a microorganism, prior to being seeded on the culture medium, has been exposed to light within a spectral range of 300–750 nm.

It is preferable to expose the culture to light at an intensity of not greater than 5.10$^3$ erg/cm$^2$.sec for a period of 1 to 30 min or at an intensity of not higher than 10$^{16}$ erg/cm$^2$.sec for a period of from 1.10$^{-9}$ to 10$^2$ sec.

In order to increase the sensitivity of the cells of microorganisms, illumination of the inoculation culture is carried out in the presence of a vital sensitizing pigment capable of absorbing light radiation within said spectral range, said pigment being taken at a concentration of 10$^{-7}$ to 10$^{-3}$ mole.

Methylene blue is preferably used as the sensitizing pigment.

The herein-disclosed method is carried out as follows.

Just prior to being seeded on the culture medium contained in a cultavator, the microorganism to be inoculated we exposed to light having a definite spectral composition, intensity and duration.

The illuminated cells of microorganisms are diluted to a required density not in excess of 0.6 of a unit of optical density within either a solution of the culture liquid, with water, physiological saline, or a solution of the vital sensitizing pigment or combinations thereof.

For every particular microorganisms, specific illuminating conditions of with the inoculate must be selected, the effective wavelength of the light used being taken within the range of from 300 to 750 nm.

The use of light at a wavelength shorter than 300 nm fails to prevent the mutagenous effect of the UV rays. On other hand, light at a wavelenth longer than 750 nm fails to render a specific effect upon the vital activity of the microorganisms being irradiated.

Of great importance is the proper selection of an optimum light intensity and duration of exposure to said light. Even minute departure from the selected irradiation conditions might impair the effect of the process.

The most optimum conditions are as follows.

At low light intensity values (not exceeding 5.10$^3$ erg/cm$^2$.sec) the duration of illumination must be kept within 1 to 30 minutes. For instance, at a wavelength $\lambda = 440$ nm and light intensity of 100 erg/cm$^2$.sec, the most optimum duration of illumination is 5 minutes.

At higher light intensity the time of exposure of the seeding material to light is diminished accordingly.

In this case at a maximum light intensity having a 10$^{16}$erg/cm$^2$.sec duration of illumination must range within 1.10$^{-9}$ to 10$^2$ sec. Thus, the inoculate may be illuminated with light at a wavelength of 330 nm and an intensity of 10$^5$ erg/cm$^2$.sec. within a 10 sec range with a considerable intensification resulting for the vital activity of microorganisms. Prolongation of the exposure time to 3 min results in suppression of the similar processes, whereas light at a wavelength of 695 nm and an intensity of 10$^{15}$ erg/cm$^2$.sec stimulates the processes of biosynthesis having an exposure time of 10$^{-8}$ sec.

To increase the light sensitivity of the cells of the microorganisms, it is expedient to use the vital sensitizing pigments capable of absorbing light within said spectral range, such as for instance methylene blue, Janus green and like pigments.

Said pigments are preferably used at a concentration of from 10$^{-7}$ to 10$^{-3}$ mole. Upon having been exposed to light, the seeding material is then introduced into the fermenter to be cultivated therein.

Preceeding light irradiation of the inoculate results in a large increase of the yield of the protein products, enzymes, antibiotics, gibberellins, toxines, fats, vitamins, esters, organic acids, alcohols, amino-acids and other bioligically active compounds; besides a considerable increase in the cell division rate, a reduced duration of the lag phase, exponential and logarithmic phase and a higher yield of the dry biomass are also observed.

The proposed method permits simplification of the process technique due to exposing only the seeding material to light.

The method is equally effective when spread over a wide range of microorganisms that are the producers of a diversity of biologically active compounds. The method of the invention also effects an increase in the yield of the biologically active products, and a considerable reduction of the time involved for cultivating microorganisms due to a faster passing of every stage of the growth cycle thereby. The disclosed method is applicable for both intermittent and continuous production processes.

To promote better understanding, given below are a number of exemplary embodiments of the method of cultivating microorganisms as disclosed in the present invention.

EXAMPLE 1

The culture of *Pseudomonas fluorescens* is twice seeded in a beef-extract broth containing 0.1 percent of nitre (saltpetre). A third seeding is carried out at a time inter- such that the seeding material would age for 18 hours from the beginning of the experiment. The seeded material thus obtained is transferred to quartz test tubes and exposed to monochromatic light for 5 minutes at a wavelength of 340 nm and an intensity of 700 erg/cm$^2$.sec emitted by the lamp ДРШ -1000 (mercury-vapour arc spherical lamp, 1000 W). Thereupon, both irradiated and non-irradiated (control) specimens of the culture are seeded in a culture medium which is essentially a beef-extract broth with an additional 0.1 percent nitre (saltpetre), whereupon said culture medium is also dispensed to test tubes. A paraffin layer is applied to the surface of the culture medium to provide absolute anaerobic conditions. Upon inoculation all are placed in a 30°C temperature-controlled cabinet to stand.

When the culture of *Pseudomonas fluorescens* enters the initial stationary phase of development, the total amount of protein in the culture is determined by Lowery, and the amount of vitamin B$_2$, is determined on a fluorometer. A 60-wt percent increase in the yield of protein products and a 130-wt. percent increase in that of vitamin B$_2$ are observed under said illuminating conditions.

EXAMPLE 2

Preparation of the seeding material of *Pseudomonas fluorescens* is carried out in a way similar to that described in Example 1. The inoculate is illuminated for 10 minutes with light having a wavelength of 390 nm and an intensity of 700 erg/cm$^2$.sec emitted from a ДРШ -1000 lamp. Further cultivation and determination of the total amount of protein and vitamin B$_2$ are conducted as described in Example 1. Under such conditions a 75-wt. percent increase in the yield of protein products and a 85-wt. percent increase in that of vitamin B$_2$ are observed.

EXAMPLE 3

Spores for the cultivation of *Clostridium butyricum* are obtained in the following way: a 25-percent potato medium with an addition of chalk is dispensed to test tubes in a high layer. The medium is heated for 40-60 min on a boiling water bath before seeding. After the test tubes have been cooled to 30°–40°C, 0.2 ml of the spores are introduced into each test tube to be deposited upon the bottom thereof. Fermentation occurs within 7–10 days at 37°C. Upon termination of the fermentation process, the test tubes are sealed and allowed to stand in darkness at 20°C. The spores were allowed to germinate on a glucose-peptone medium of the following composition before setting up the experiment: glucose, 2 wt. percent; peptone, 1 wt. percent; $KH_2PO_4$, 0.1 wt. percent; chalk deposited upon the test tube bottom; $H_2O$ to make up 100 wt. percent.

The medium is heated on a boiling water bath during 40–60 minutes priss to seeding. The spores in an amount of 1 percent of the volume of the medium is deposited upon the bottom of quartz test tubes to grow for 24 hours at 37°C. The thus-obtained culture is used as an inoculate for the experiments.

These experiments are directed to growing the following composition on a synthetic medium: 1 wt. percent glucose; 0.1 wt. percent fumaric acid; 0.3 wt. percent $(NH_4)_2HPO_4$; 140 mg/ml KOH; 0.001 mg/ml biotin, $H_2O$ to make up 100 wt. percent; pH value of the medium being within 6.7 to 6.8.

The inoculate is exposed for 5 minutes to monochromatic light at a wavelength of 440 nm and intensity of 200 erg/cm².sec emitted by lamp ДРШ -1000 before being seeded in the above medium. Upon illumination the seeding material is introduced into the culture medium to be cultivated at a temperature of 37°C until reaching the initial stationary phase of growth. At that time the total content of common protein is determined by the Lowry method and the number of cells in the culture of *Clostridium butyricum* is determined by the Vinogradsky mehtod. Under the afore-said light-exposure conditions, a 30-wt. percent increase in the yield of protein products and a 75-percent gain in the cell division rate was observed.

EXAMPLE 4

The preparation of the seeding material *Clostridium butyricum* is carried out similarly to that method described in Example 3. The seeding material is exposed to a light emitted from a БУВ -30 lamp (bactericidal UV-radiation lamp, 30 W) in conjunction with a light filter passing a light having a wavelength of $\lambda > 310$ nm to preclude the lethal effects of a shorter UV spectral range. The light intensity is 200 erg/cm².sec, with exposure time being 20 minutes. A 170-percent acceleration of the cell division rate and a 35-wt. percent increase in the yield of protein products were observed under such conditions. Besides, as a result of the illumination of the inoculate under said conditions, a sharp decrease of the lag phase is observed (from 6 hours in the control experiment to 3.5 hours in the test).

EXAMPLE 5

*Aspergillus oryzae* seeding material is prepared according to the following technique: a agar-wort medium from the slant surface of a washout of the culture of *Aspergilus oryzae* is taken with 10 ml of sterile water.

1 ml of the thus-obtained suspension is then inoculated into the flasks containing the sterile bran moistened with up to 50 percent of $H_2O$, whereupon it is placed in a 30°C temperature - controlled cabinet for 72 hours. The thus grown culture is dilated with 100 ml sterile water, and the mixture is stirred and allowed to settle. Thereupon, the supernatant liquid is used as a seeding material for exposure to light emitted by lamp $\gamma\beta$-30 having an intensity of $2\cdot 10^3$ erg/ cm$^2$. sec for 15 minutes. 4 ml of the irradiated material in an amount is introduced into 250-ml capacity glass conical flasks each containing 10 g of sterile bran water-moistened up to 65 percent.

The control test of the non-exposed inoculate is seeded. The flasks are placed in a temperature-controlled cabinet to stand for 36 hours at 30°C after seeding. Upon completion of the growth process the proteclytic activity of the culture of fungus *Aspergillus oryzae* is determined. To this end, 5 g of the fungus-intergrown bran are placed in 45 ml of distilled water and 5 ml of a phosphate buffer solution having a pH value of 7.2. The suspension is allowed to stand in a temperature-controlled cabinet for 1 hour at 30°C, whereupon it is filtered with the filtrate being used as a working enzyme solution.

0.5 ml of the enzyme solution are mixed with 2.5 ml of a 2-percent haemoglobin solution at pH value of 7.2 and the mixture is allowed to stand at 30°C for 60 minutes. The reaction of haemoglobin proteolysis is interrupted by adding 5 ml of a 0.3 M solution of trichloroacetic acid; the resultant precipitate is eliminated in 15 minutes. The activity of proteinase is found to be in a ratio with the concentration of a free amino acid, viz., iyrosine which appears as a result of the enzymatis decomposition of haemoglobin. The concentration of tyrosine is determined on a spectrophotometer with subsequent recalculation against a calibration curve.

Under the conditions of the preseeding illumination of the inoculate, a 20-percent increase in proteolytic activity is observed in the experiment as compared to the control test.

EXAMPLE 6

A culture of *Candida guilliermondil* is grown on the slants of an agar-wort medium for a period of up to 24 hours at 30°C. Each slant is than washed with 5 ml H$_2$O. A cell suspension taken in an amount of 1.5 ml is placed in 15 mm Erlenmeyer flasks. The prepared seeding material, prior to being seeded is exposed to a flashing light having a wavelength of 694.3 nm and an intensity of $10^{15}$ erg/cm$^2$.sec, the duration of a flash is $2.10^{-8}$. Upon irradiation the inoculate is seeded into shaking flasks. As a control, use is made of non-irradiated seeding materials which are also inoculated into shaking flasks. The yeast is cultivated on a liquid culture medium having the following composition: NH$_4$H$_2$PO$_4$, 2 g; (NH$_4$)$_2$HPO$_4$,2 g; K$_2$SO$_4$,2 g; MgSO$_4$, 2 g; autolysate, 20 ml; water to 1 litre; paraffin is introduced into the flasks in an amount of 1 ml per 100 ml medium. 1 ml of the cell suspension is introduced into each flask with the initial density being equal to 0.07-0.1 of a unit of optical density. The flasks are placed on a shaker upon seeding, wherein the microorganisms are allowed to grow for a period of up to 24 hours at 30°C. The culture development rate is determined as a function of the increase in the number of cells and the dynamics of the variation of pH value of the medium are determined well in this experiment.

The total amount of the biomass is determined as well.

It is established herein that the preliminary exposure of the inoculate to light accelerates the development rate of *Candida guilliermondii* two times and increases the cell biomass by 100 percent.

EXAMPLE 7

The seeding material *Candida guilliermondii* is prepared in a way similar to that described in Example 6. The seeding material is illuminated by a flashing light at a wavelength of 694.3 nm, having a light intensity of $10^{10}$ erg/cm$^2$.sec and a flask duration of $3.10^{-3}$ sec. Upon having been irradiated the inoculate is seeded and transferred into shaking flasks to be grown therein as described in Example 6.

It has been established that the preliminary illumination of the seeding material results in a 1.5 times faster development of *Candida guilliermondii* and a 50-wt. percent gain in the amount of the biomass.

EXAMPLE 8

A culture of *Candida guilliermondii* is grown in the slants of an agar-wort nutrient medium for a period of up to 24 hours at 30°C. Each slant is washed out with 5 ml of an aqueous solution of a vital sensitizing pigment, viz., methylene blue taken at a concentration of $10^{-4}$M. Further operations proceed by following the technique adopted in Example 7.

It has been established that under such conditions a twofold faster development of the microorganisms and a 100-wt. percent gain in cell biomass.

EXAMPLE 9

The preparation of the seeding material of *Candida guilliermondii* is similar to that described in Example 6. The seeding material is exposed to light at a wavelength of 360 nm and intensity of $10^5$ erg/cm$^2$.sec for 60 sec. Upon irradiation the inoculate is seeded into shaking flasks to be grown therein as described in Example 6.

It has been found that under such conditions an 80-percent gain in the weight of the cell biomass is attained.

EXAMPLE 10

The seeding material of *Bacillus brevis var. O-B* is grown on Petri dishes using a culture medium having the following composition (medium I): water, 1 l; amino nitrogen, 10 g; peptone, 10 g; NaCl, 5 g; agar-agar, 35 g. Inoculation is carried out uniformly with a loop from a single colony uniformly over the entire dish. Cultivation occurs at 37°C for 48 hours, whereupon 5-6 fully developed colonies are taken by a loop and plaed in a shaking flask containing the liquid culture medium of the following composition (medium II): water, 1 l; NaCl, 5 g; MgSO$_4$, 0.2 g; glycerol, 20 g; ammonium oxalate, 8.12 g; K$_2$HPO$_4$, 9.9 g; lactic acid, 8 ml/lit. Cultivation is conducted for 17 hours at 40°C. 15 ml of the resulting inoculate is exposed to light at a wavelength of 440 nm and an intensity of $4.10^4$ erg/cm$^2$.sec for 30 sec and then placed in shaking flasks containing medium II.

A non-exposed inoculate is placed into comparison flasks. Cultivation is carried out in shaking flasks at 40°C for 48 hours. 1 ml of the suspension is sampled from each flask upon termination of the growth and, 3 ml of 96-percent ethanol are added thereto and the mixture is allowed to stand for 24 hours at 37°C.

Antibiotic activity is determined by the diffusion method an into agar medium.

As the test-organism used is made of *Bacillus subtilis* which is seeded on a solid medium III having the following composition: Hottinger broth, 1 liter; distilled water, 3 liters; agar, 2 wt. percent; KCl, 2 wt. percent; pH value being 7.2.

Then a number of 4-mm dia. pockets or wells are made in the solid medium into which equal volume amounts of the control and the test gramicidin solutions are poured.

The medium is then placed in a temperature-controlled cabinet for 24 hours at 37°C. the diameter of a sterile zone around the pocket is proportionate to the antibiotic activity of the medium. It has been found that a preliminary illumination of the inoculate results in a 150–200 percent higher antibiotic activity than that of the control test medium.

What we claim is:

1. A method for cultivating microorganisms comprising exposing a seeding culture of a microorganism to light illumination only within a spectral range of 300–750 nm in the presence of a vital sensitizing pigment capable of absorbing light within said spectral range, and then growing the seeded culture in a culture medium.

2. A method as claimed in claim 1, wherein the light illumination carried out has an intensity of not over $5.10^3 erg/cm^2.sec$ for a period of from 1 to 30 minutes.

3. A method as claimed in claim 1, wherein the illumination is carried out by light at an intensity of not over $10^{16} erg/cm^2.sec$ for a period of from $1.10^{-9}$ sec to $10^2$ sec.

4. A method as claimed in claim 3, wherein the vital sensitizing pigment is present in a concentration of from $10^{-7}$ to $10^{-3}$ mole.

5. A method as claimed in claim 4, wherein methylene blue is the vital sensitizing pigment.

* * * * *